(12) United States Patent
Alewine et al.

(10) Patent No.: US 8,010,345 B2
(45) Date of Patent: Aug. 30, 2011

(54) PROVIDING SPEECH RECOGNITION DATA TO A SPEECH ENABLED DEVICE WHEN PROVIDING A NEW ENTRY THAT IS SELECTABLE VIA A SPEECH RECOGNITION INTERFACE OF THE DEVICE

(75) Inventors: Neal J. Alewine, Lake Worth, FL (US); Daniel E. Badt, Atlantis, FL (US)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 11/958,713

(22) Filed: Dec. 18, 2007

(65) Prior Publication Data

US 2009/0157392 A1 Jun. 18, 2009

(51) Int. Cl.
*G10L 19/00* (2006.01)
(52) U.S. Cl. ............... 704/201; 704/243; 704/257
(58) Field of Classification Search .......... 704/251, 704/231, 243, 244, 250, 255, 256, 270.1, 704/235, 257, 201; 370/352
See application file for complete search history.

(56) References Cited

U.S. PATENT DOCUMENTS

| 6,907,397 B2* | 6/2005 | Kryze et al. ............ 704/251 |
| 7,382,770 B2* | 6/2008 | Bergman et al. ......... 370/352 |
| 7,533,023 B2* | 5/2009 | Veprek et al. ........... 704/270.1 |
| 2005/0015254 A1 | 1/2005 | Beaman |
| 2006/0095848 A1 | 5/2006 | Naik |
| 2007/0180383 A1 | 8/2007 | Naik |

* cited by examiner

*Primary Examiner* — Huyen X. Vo
(74) *Attorney, Agent, or Firm* — Patents on Demand, P.A.; Brian K. Buchheit; Scott M. Garrett

(57) ABSTRACT

The present invention discloses a solution for providing a phonetic representation for a content item along with a content item delivered to a speech enabled computing device. The phonetic representation can be specified in a manner that enables it to be added to a speech recognition grammar of the speech enabled computing device. Thus, the device can recognize speech commands using the newly added phonetic representation that involve the content item. Current implementations of speech recognition systems of this type rely internal generation of speech recognition data that is added to the speech recognition grammar. Generation of speech recognition data can, however, be resource intensive, which can be particularly problematic when the speech enabled device is resource limited. The disclosed solution offloads the task of providing the speech recognition data to an external device, such as a relatively resource rich server or a desktop device.

16 Claims, 3 Drawing Sheets

PROVIDING SPEECH RECOGNITION DATA TO A SPEECH ENABLED DEVICE WHEN PROVIDING A NEW ENTRY THAT IS SELECTABLE VIA A SPEECH RECOGNITION INTERFACE OF THE DEVICE

BACKGROUND

1. Field of the Invention

The present invention relates to the field of speech recognition technologies and, more particularly, to providing speech recognition data to a speech enabled device when providing a new entry that is selectable via a speech recognition interface of the device.

2. Description of the Related Art

Speech recognition interfaces are included in many different types of computing devices, which advantageously provide an intuitive mechanism through which users are able to interact with the devices. Speech recognition interfaces can be especially advantageous when utilizing a computing device in a hands-free manner (e.g., such as using an in vehicle navigation system while driving) and/or when utilizing a portable computing device (e.g., a digital audio player, a smart phone, a personal data assistant, etc.) that lacks a robust set of easy to use input mechanisms.

Many of these speech enabled computing devices permit a user to connect to a remotely located content source to obtain new content. For example, music enhanced mobile phones and/or MP3 players can include a networking option for downloading or acquiring new songs. It can be difficult for speech enabled computing devices to create speech recognition entries for the new content since creating such content is typically a resource intensive activity and the speech enabled computing devices can be resource limited ones. Even when the speech enabled device is capable of creating speech recognition data to permit new content to be speech recognized, these devices often must use minimalistic algorithms, which generate speech recognition data less perfectly than would be preferred. Further, regardless of the capabilities of a speech enabled device, a significant amount of computing power is needed to create speech recognition data, if it is even possible.

All of these limitations result in user perceived shortcomings. For example, a "speech enabled" MP3 player can lack of speech recognition capabilities to select songs through voice input, can support only a limited number of speech recognizable songs, can have inaccuracies when attempts to choose a large number of songs via a voice command are made, and can perform poorly or freeze for noticeable periods when new songs are added. What is needed is a new technique for adding entries to a device's speech recognition grammar, which is not dependent upon the speech enabled device's ability to internally generate speech recognition data for new content.

SUMMARY OF THE INVENTION

The present invention discloses a solution for providing a phonetic representation for a content item along with a downloaded/acquired content item delivered to a speech enabled computing device. The phonetic representation can be specified in a manner that enables it to be added to a speech recognition grammar of the speech enabled computing device. The device can recognize speech commands using the newly added phonetic representation that involve the content item. Current implementations of speech recognition systems of this type rely internal generation of speech recognition data that is added to the speech recognition grammar. Generation of speech recognition data can, however, be resource intensive, which can be particularly problematic when the speech enabled device is resource limited (e.g., a digital audio player, a smart phone, a navigation device, etc.). The disclosed solution offloads the task of providing the speech recognition data to an external device, such as a relatively resource rich server or a desktop machine.

In one embodiment, once speech recognition data has been generated, it can be saved along an identifier for the content item so it can be provided in response to future requests. Further, a centralized repository of generated pronunciations can be established, which can be used/accessed by content providing servers. For example, in a music pronunciation context, the centralized repository can be a comprehensive database of song title, album, artists, and genre pronunciations, which is able to be accessed whenever a song is requested for a speech enabled device. This centralized repository can permit speech recognition data to be provided to clients, without a need for a content host to generate the pronunciation data for each request. The repository can automatically grow with use, since speech recognition data can be generated when needed and stored in the repository. Thus, use of a pronunciation repository or other such pronunciation store can minimize consumed computing resources relating to generating speech recognition data and can enhance solution scalability.

The present invention can be implemented in accordance with numerous aspects consistent with the materials presented herein. One aspect of the present invention can include a method for offloading a task of generating speech recognition data for a recognition grammar used by a speech enabled device. The method can include a step of identifying at least one content item, which lacks an entry in a speech recognition grammar used by a speech enabled device. A computing device external to the speech enabled device can generate speech recognition data for content item. The generated speech recognition data can be conveyed in a digitally encoded form within a carrier wave to the speech enabled device. The generated speech recognition data can be added to the speech recognition grammar, which thereafter permits the speech enabled device to identify speech input as being associated with the at least one content item.

Another aspect of the present invention can include a method for integrating new content into a speech enabled device. In the method, at least one content item can be requested from a source external to a speech enabled device. The requested content item can be received along with speech recognition data associated with the content item. The speech recognition data can be added to a speech recognition grammar of the speech enabled device. The content item can be added to a data store of the speech enabled device. Thereafter, speech input can be received by the speech enabled device, which can be speech recognized using the speech recognition grammar. Results from the speech recognizing step can be derived from the added speech recognition data and can indicate that an operation related to the content item is desired. A programmatic action involving the content item can then be executed by the device.

Still another aspect of the present invention can include a method of providing content to a speech enabled device along with associated speech recognition data. The method can include a step of receiving a request for a content item from a remotely located speech enabled device. An identifier for the content item can be determined. Speech recognition data for the identifier can be retrieved/created. The speech recognition data can represent a recognition grammar entry for the identifier. The content item and the identified speech recognition data can be conveyed to the speech enabled device.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
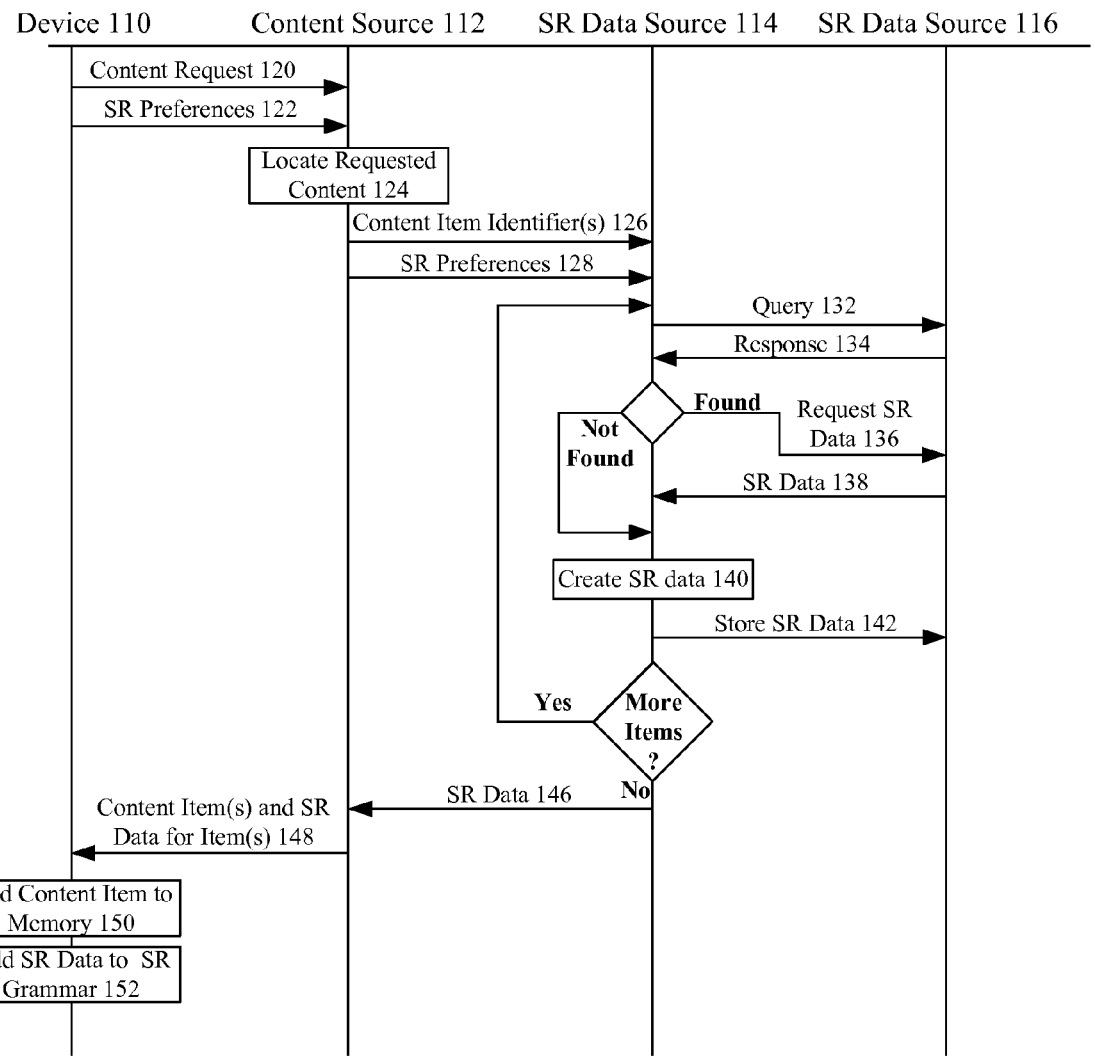
FIG. 1 is a flow diagram showing interactions between a device, a content source, a speech recognition data source, and/or a speech recognition data base, where when content is provided to the device corresponding speech recognition data for the content is also provided.

FIG. 1 is a flow diagram 100 showing interactions between a device 110, a content source 112, a speech recognition data source 114, and a speech recognition data store 116. When content is provided to the device 110 corresponding speech recognition data for the content is also provided, which alleviates a need for device 100 to internally generate the speech recognition data. In one embodiment, the speech recognition data associated with the content can be automatically provided without an explicit user selection. In another embodiment, an entire recognition grammar used by the device 110, which includes the speech recognition grammar, can be generated/acquired by the content source 112 and conveyed to the speech enabled device 110. Providing a complete recognition grammar can offload a task of grammar compilation, which can be resource intensive, to the content source 112. Compiling a recognition grammar can require a list of items for the grammar be maintained by the content source 112 and/or be conveyed to the content source 112 from the device 110. It should be appreciated that many speech enabled devices 110 can be resource limited devices, such as mobile phones and MP3 players, ill suited for a burden of generating speech recognition data and/or of compiling a recognition grammar.

As shown by diagram 100, the device 110 can convey a content request 120 to content source 112. An optional set of speech recognition preferences 122 can also be conveyed. The content source 112 can then locate the requested content 124. If the content is not located, an error message can be conveyed to the device 110 and the process can terminate. Additionally, although not shown in diagram 100, device 110 may have to provide authentication information before receiving content from source 112. For example, source 112 can be a source for music downloads, where device 110 must either include a payment artifact for the requested music downloads or show proof that the requested music was previously purchased through the content source 112.

Once the content source 112 locates a set of items that satisfy the request 120, identifiers for the content item(s) can be conveyed 126 to a speech recognition data source 114. Each item can include multiple identifiers in one embodiment, each representing a means for identifying that content item via speech input. For example, if an item is a song, identifiers can be conveyed for the song title, for the artist name, and/or for the album name associated with the item.

The speech recognition data source 114 can determine if speech recognition data for the requested content item(s) already exists in a speech recognition data store 116. This determination can be made by first querying 132 the data store, which results in a query response 134. When a pre-existing entry for an item exists, a request for the associated speech recognition data 136 can be conveyed to the data store 116, which provides the data 138 in response. When no preexisting speech recognition data exists for a content item, the speech recognition data source 114 can create speech recognition data 140. Created speech recognition data 140 can be conveyed 142 to data store 116 where it can be used to satisfy similar future requests thereby saving source 114 a need to create the speech recognition data each time requests are received.

Separate queries and process can be made for each content item, as shown by branching decision block 144. Once speech recognition data has been generated for each content item, this data can be conveyed 146 to the content source 112. The content source 112 can then convey the content item(s) and the speech recognition data for the item(s) 148 to the device 110. Upon receipt, the device 110 can add 150 the content items to a list of available items. For example, a new music item can be added to a music player's content list or the added item can simply be added to a local memory space of the device 110. After adding the content item(s), the device 110 can add speech recognition data to an internal speech recognition grammar 152 and associated those grammar items with a suitable context for the content items. For instance, the device 110 can include multiple context sensitive grammars, and the speech recognition data can be added to appropriate ones of the grammars. After the speech recognition grammar has been updated, the device 110 can speech recognize input associated with the newly added content items and can perform appropriate programmatic actions upon recognizing the speech input.

Figure 2:
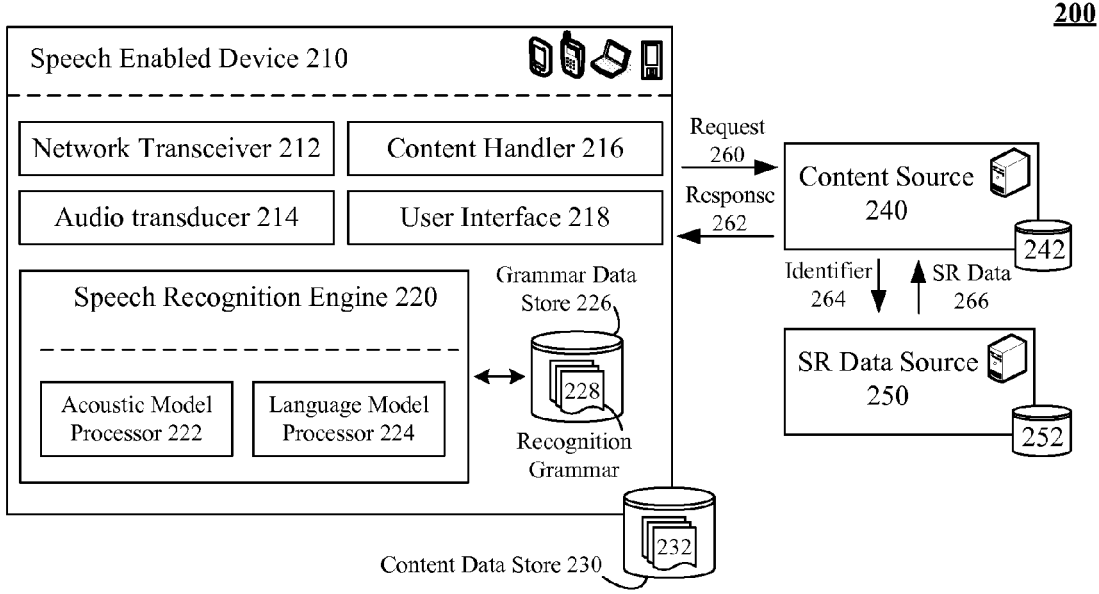
FIG. 2 is a system diagram showing a speech enabled device able to acquire content along with speech recognition data in accordance with an embodiment of the inventive arrangements disclosed herein.

FIG. 2 is a system 200 diagram showing a speech enabled device 210 able to acquire content along with speech recognition data in accordance with an embodiment of the inventive arrangements disclosed herein. Specific components 110-116 shown in diagram 100 can be implemented in accordance with specifics detailed for corresponding components described in system 200. For example, the device 110 can be an instance of speech enabled device 210.

In system 210, a speech enabled device 210 can request 260 content from a content source 240. The request 260 may or may not explicitly specify that speech recognition data is to be provided to the speech enabled device 210 depending upon implementation specifics. The content source 240 can convey identifiers 264 for the requested content to a speech recognition data source 250. The speech recognition data source 250 can either generate speech recognition data 266 for the identifier or retrieve the data 266 from a data store 252. The content source 240 can receive the speech recognition data 266, which it can convey along with requested content from data store 242 to device 210 within response 262. The device 210 can add the received content as a new content item 232 of a content data store 230. The speech recognition data can be added to a suitable recognition grammar 228 of a grammar data store 226.

In one implementation, the response 262 can include an entire compiled speech recognition grammar 228 to be placed in the data store 226, which includes entries for the newly acquired content as well as pre-existing entries. This alleviates a need for the device 210 to compile the recognition grammar 228, which can be a resource intensive operation. In one configuration, the content source 240 can maintain a list in data store 242 of items to be included in the compiled recognition grammar 228. In another configuration, a list of content items can be conveyed within the request 260 to the content source 240.

In another implementation, data store 252 can represent a data store for aggregating speech recognition data from one or more speech recognition data sources 250 able to generate this data 266 from identifiers 264. In this way data store 252 can represent a continuously updated database of speech recognition data for identifiers 264, which saves the contributing/accessing speech recognition data source(s) 250 from having to generate new speech recognition data 266 for each request 260. In a music context, for example, the pronunciation database can quickly be populated with song title, album, artists, and genre pronunciations for popular songs.

As shown in system 200, the content source 202 can be any computing device or set of computing devices able to provide digital content to the device 210 upon request 260. The content source 240 can, for example, be a network server. In one embodiment content source 240 can be a Web server, which communicates with a browser of device 210 through standard Web protocols (e.g., HTTP messages). In another embodiment, the content source 240 can be a desktop computer to which device 210 is linked, such as through a USB connection.

The speech recognition data source 250 can be any computing device or set of computing devices able to provide speech recognition data 266 that is associated with a set of items 264 upon request. The speech recognition data source 250 can be implemented as a stand-alone server, as part of a cluster of servers, within a virtual computing space formed from a set of one or more physical devices, and the like. In one embodiment, functionality attributed to the speech recognition data source 250 and the content source 240 can be incorporated within a single machine. For example, an ability to generate speech recognition data 266 can be a software enhancement able to be added to a content source 240. In another embodiment, the speech recognition data source 250 can deliver speech recognition data 266 as part of a Web service. For example, the speech recognition data source 250 can be a turn-based speech recognition engine implemented as part of a middleware solution, such as WEBSPHERE, which provides speech recognition data as a Web service to a set of content providing Web servers (source 240).

The speech recognition data 266 can include phonetic representations of content items, which can be added to a speech recognition grammar 228 of device 210. The speech recognition data can conform to a variety of grammar specification standards, such as the Speech Recognition Grammar Specification (SRGS), Extensible MultiModal Annotation Markup (EMMA), Natural Language Semantics Markup Language (NLSML), Semantic Interpretation for Speech Recognition (SISR), the Media Resource Control Protocol Version 2 (MRCPv2), a NUANCE Grammar Specification Language (GSL), a JAVA Speech Grammar Format (JSGF) compliant language, and the like. Additionally, the speech recognition data can be in any format, such as an Augmented Backus-Naur Form (BNF) format, an Extensible Markup Language (XML) format, and the like. Different devices 210 can be designed to handle different formats of speech recognition data 266, which can be specified in preferences conveyed within the request 260. Source 250 can tailor or customize a format of the speech recognition data 266 to interoperate with a format desired by/compatible with the request 260 issuing device 210. Additionally, the speech recognition data source 250 can optionally customize the speech recognition data 266 to speech characteristics (e.g., accent, dialect, gender, etc.) of a user of device 210 to improve recognition accuracy of a speech recognition engine 220 used by device 210. User specific characteristics upon which a user specific customization is based can be conveyed within request 260 or can be maintained within a data store 242 of a content source 240 in a user specific record.

The speech enabled device 210 can be any computing device able to accept speech input and to perform programmatic actions in response to the received speech input. The device 210 can, for example, include a speech enabled mobile phone, a personal data assistant, an electronic gaming device, an embedded consumer device, a navigation device, a kiosk, a personal computer, and the like. The speech enabled device 210 can include a network transceiver 212, an audio transducer 214, a content handler 216, a user interface 218, and a speech recognition engine 220.

The network transceiver 212 can be a transceiver able to convey digitally encoded content with remotely located computing devices. The transceiver 212 can be a wide area network (WAN) transceiver or can be a personal area network (PAN) transceiver, either of which can be configured to communicate over a line based or a wireless connection. For example, the network transceiver 212 can be a network card, which permits device 210 to connect to content source 240 over the Internet. In another example, the network transceiver 212 can be a BLUETOOTH, wireless USB, or other point-to-point transceiver, which permits device 210 to directly exchange content with a proximately located content source 240 having a compatible transceiving capability.

The audio transducer 214 can include a microphone for receiving speech input as well as one or more speakers for producing speech output.

The content handler 216 can include a set of hardware/software/firmware for performing actions involving content 232 stored in data store 230. For example, in an implementation where the device 210 is an MP3 player, the content handler can include codecs for reading the MP3 format, audio playback engines, and the like.

The user interface 218 can include a set of controls, I/O peripherals, and programmatic instructions, which enable a user to interact with device 210. Interface 218 can, for example, include a set of playback buttons for controlling music playback (as well as a speech interface) in a digital music playing embodiment of device 210. In one embodiment, the interface 218 can be a multimodal interface permitting multiple different modalities for user interactions, which include a speech modality.

The speech recognition engine 220 can include machine readable instructions for performing speech-to-text conversions. The speech recognition engine 220 can include an acoustic model processor 222 and/or a language model processor 2244, both of which can vary in complexity from rudimentary to highly complex depending upon implementation specifics and device 210 capabilities. The speech recognition engine 220 can utilize a set of one or more grammars 228. In one embodiment, the data store 226 can include a plurality of grammars 228, which are selectively activated depending upon a device 210 state. Accordingly, grammar 228 to which the speech recognition data 266 is added can be a context dependent grammar, a context independent grammar, a speaker dependent grammar, and a speaker independent grammar depending upon implementation specifics for system 200.

Each of the data stores 226, 230, 242, 252 can be physically implemented within any type of hardware including, but not limited to, a magnetic disk, an optical disk, a semiconductor memory, a digitally encoded plastic memory, a holographic memory, or any other recording medium. Each data store 226, 230, 242, 252 can be stand-alone storage units as well as a storage unit formed from a plurality of physical devices, which may be remotely located from one another. Additionally, information can be stored within the data stores 226, 230, 242, 252 in a variety of manners. For example, information can be stored within a database structure or can be stored within one or more files of a file storage system, where each file may or may not be indexed for information searching purposes.

Figure 3:
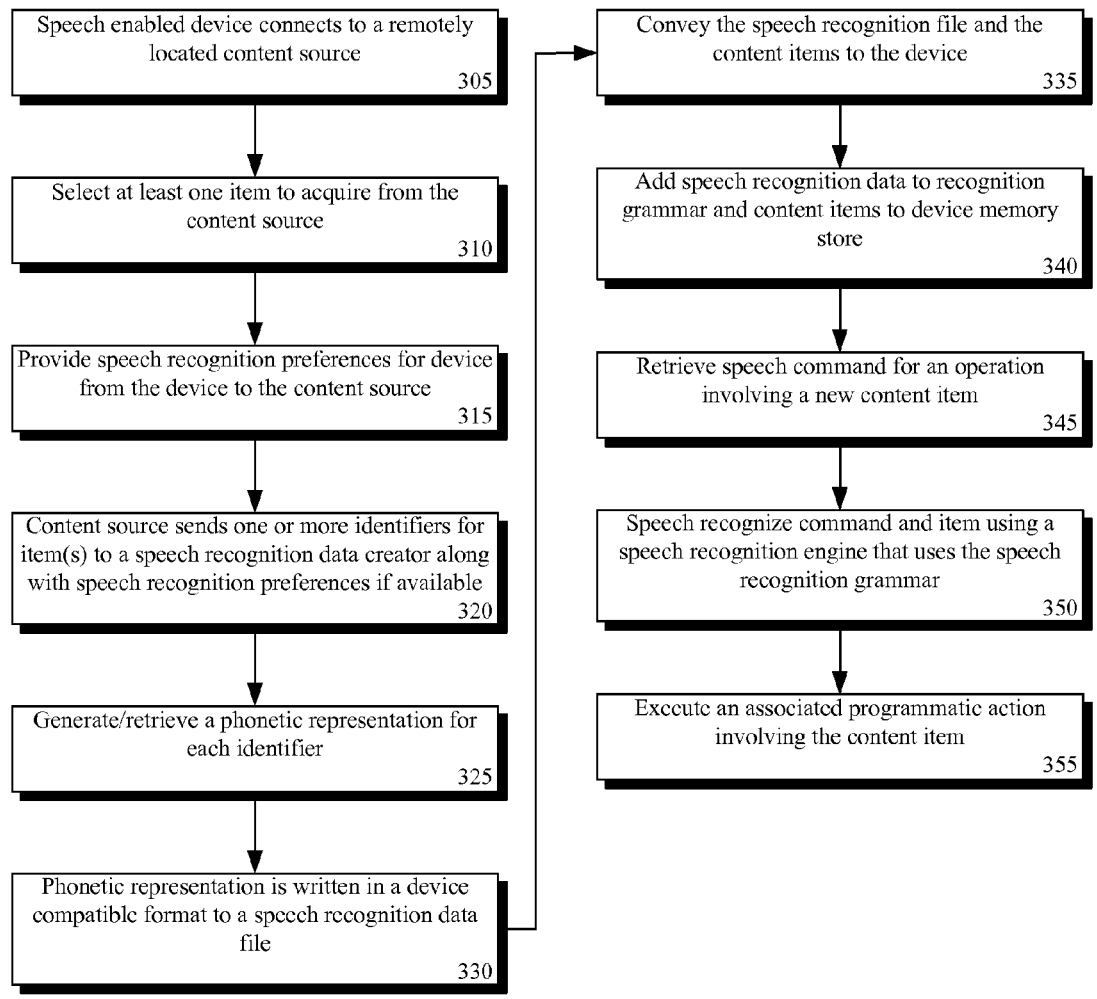
FIG. 3 is a flow chart of a method for acquiring content along with speech recognition data to a speech enabled device in accordance with an embodiment of the inventive arrangements disclosed herein.

FIG. 3 is a flow chart of a method 300 for acquiring content along with speech recognition data to a speech enabled device in accordance with an embodiment of the inventive arrangements disclosed herein. The method 300 can be performed in the context of a system 200 or similar speech recognition system.

Method 300 can begin in step 305, where a speech enabled device can connect to a remotely located content source over a network. In step 310 at least one item to acquire from the content source to the speech enabled device can be selected, such as through a Web browser. In step 315, speech recognition preferences can be optionally conveyed form the device to the content source. Speech recognition preferences are only needed when the speech recognition data ultimately provided to the speech enabled device is customized and/or formatted for a specific user or device. Other embodiments exist, where the speech recognition data provided to the device is uniform across requesting devices, which makes caching speech recognition data more efficient.

Even when customized speech recognition data is required, this data need not be provided by the device in step 315. In a different configuration, for instance, the content source or other network element can store user/device specific preferences that include speech recognition preferences. Assuming a user logs into the content source or otherwise identifies themselves, it is a simplistic task to identity and match a user/device with stored preferences. In another implementation, speech preferences can be automatically extracted/determined from speech input provided by a user, which assumes that speech samples are either captured within the device and conveyed to the content source or that interactions with the content source are through a speech interface.

Once the content source determines an availability of the requested item(s), it can determine textual identifiers for the item(s). A textual identifier can be any identifier used to reference the content items, such as a name of the item. These identifiers can be conveyed along with any available speech recognition preferences to a speech recognition data creator, as shown by step 320. In step 325, a phonetic representation of the textual identifiers can be generated/received. In step 325, the phonetic representation can be written to a speech recognition data file in a device compatible format. This data file can be conveyed to the content requesting device along with the content items in step 335.

In step 340, the speech recognition data can be added to a recognition grammar of the speech enabled device and the content items can be added to a device memory. In step 345 a speech command for an operation involving one of the new content items can be received. In step 350, this speech command can be speech recognized by a speech recognition engine of the device. A programmatic action can execute based upon the speech recognized command that involves the content item.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for integrating new content into a speech enabled device comprising:
    transmitting, from a speech enabled device comprising software and hardware, a request for at least one content item from a source external to the speech enabled device;
    the source external to the speech enabled device determining an identifier for the content item, at a computing device comprising hardware and software, an identifier for the content item, dynamically creating speech recognition data for the identifier if no pre-existing speech recognition data for the identifier exists, and transmitting the content item and the dynamically created speech recognition data to the speech enabled device;
    receiving, at the speech enabled device, the requested content item along with the speech recognition data associated with the content item;
    adding the received speech recognition data to a speech recognition grammar of the speech enabled device; and
    adding the content item to a data store of the speech enabled device.

2. The method of claim 1, further comprising: receiving speech input; speech recognizing, at the speech enabled device, the received speech input using the speech recognition grammar, wherein results from the speech recognizing step are derived from the added speech recognition data and indicate that an operation related to the content item is to be performed; and executing programmatic action involving the content item.

3. The method of claim 2, wherein the speech enabled device is a music playing device, and wherein the content item is a digitally encoded song.

4. The method of claim 1, further comprising: receiving a user selection of the content item, where the transmitting step is performed responsive to the receiving of the user selection, wherein said user selection explicitly requests the content item but fails to explicitly request the speech recognition data for the content item, which is provided automatically by a content source remote from the speech enabled device along with the content item.

5. The method of claim 1, wherein the source is a Web server, said method further comprising:
connecting the speech enabled device to the Web server over a network;
presenting a set of available content of a Web site managed by the Web server via an interface of the speech enabled device to a user of the speech enabled device;
receiving user input of a selection of the set of content, wherein the selection comprises the at least one content item; and
responsive to the user input, the speech enabled device performing the requesting step.

6. The method of claim 1, wherein the source is a desktop computer, and wherein said speech enabled device is a portable computing device, said method further comprising: connecting the speech enabled device to the desktop computer using a direct communication link, which is at least one of a serial link and a radio frequency link.

7. The method of claim 1, wherein a computing device remote from the speech enabled device compiles the speech recognition grammar containing the added speech recognition data, wherein the compiled speech recognition grammar is conveyed in a digitally encoded form from the remote computing device to the speech enabled device, and wherein the speech enabled device thereafter stores the compiled speech recognition grammar in a local data store and performs speech recognition based on the compiled speech recognition grammar.

8. A method of providing content to a speech enabled device along with associated speech recognition data comprising:
receiving, at a computing device comprising hardware and software, a request for a content item from a remotely located speech enabled device;
the computing device determining an identifier for the content item;
identifying speech recognition data representing a recognition grammar entry for the identifier;
the computing device dynamically creating speech recognition data for the identifier if no speech recognition data is identified; and
the computing device conveying the content item and the identified or dynamically created speech recognition data to the speech enabled device.

9. The method of claim 8, further comprising:
the computing device querying a data store containing a plurality of identifiers and associated speech recognition data entries; and
the computing device receiving said speech recognition data from the data store responsive to the querying step.

10. The method of claim 8, further comprising: compiling a speech recognition grammar comprising the identified speech recognition data, wherein said conveying step conveys the content item and said compiled speech recognition grammar to the speech enabled device.

11. The method of claim 8, further comprising:
the computing device adding an entry to a data store external to the remotely located speech enabled device for the created speech recognition data and an associated entry for the identifier, wherein said added entry is utilized by the method to respond to future requests for the content item so that the dynamically creating step is unnecessary for these future requests.

12. The method of claim 8, further comprising:
the computing device identifying a set of device specific parameters for the speech enabled device; and
the computing device formatting the speech recognition data in accordance with a speech grammar specification standard compatible with the device specific parameters.

13. The method of claim 8, further comprising:
the computing device identifying a set of user specific parameters for a user of the speech enabled device, wherein said user specific parameters comprise speech characteristics of the associated user; and
the computing device customizing the speech recognition data during the dynamically creating step in accordance with the speech characteristics of the associated user.

14. The method of claim 8, wherein a Web server performs said steps of claim 8 in accordance with a set of programmatic instructions executed by the Web server that are stored in a non-transitory machine readable storage medium, and wherein said speech enabled device is a client communicating with the Web server over a network, wherein said content item is one of a plurality of user selectable content items available for downloading to said client.

15. The method of claim 8, wherein said steps of claim 8 are performed by at least one machine in accordance with at least one computer program stored in a non-transitory computer readable storage media, said computer programming having a plurality of code sections that are executable by the at least one machine.

16. A computer program product comprising a non-transitory computer useable storage medium having computer usable program embodied therewith, wherein the computer usable program code when executed on a computing device comprising hardware and software causes the computing device to:
receive, at the computing device comprising hardware and software, a request for a content item from a remotely located speech enabled device;
determine, at the computing device, an identifier for the content item;
identify, at the computing device, speech recognition data representing a recognition grammar entry for the identifier;
dynamically create, at the computing device, speech recognition data for the identifier if no speech recognition data is identified; and
conveying, at the computing device, the content item and the identified or dynamically created speech recognition data to the speech enabled device.

* * * * *